United States Patent [19]
Fuchs et al.

[11] Patent Number: 5,862,962
[45] Date of Patent: Jan. 26, 1999

[54] FLUID MEDIA DISPENSER AND METHOD OF MANUFACTURING DISPENSER

[75] Inventors: Karl-Heinz Fuchs; Stefan Ritsche, both of Radolfzell, Germany

[73] Assignee: Ing. Erich Pfeiffer GmbH, Germany

[21] Appl. No.: 709,757

[22] Filed: Sep. 9, 1996

[30] Foreign Application Priority Data

Sep. 7, 1995 [DE] Germany ............... 195 33 052.8

[51] Int. Cl.⁶ ............................................. B67D 5/60
[52] U.S. Cl. .............................. 222/464.1; 222/382
[58] Field of Search ............................ 222/464.1, 211, 222/382, 402.1

[56] References Cited

U.S. PATENT DOCUMENTS

| 3,301,438 | 1/1967 | Tillotson | 222/464.1 |
|---|---|---|---|
| 3,645,424 | 2/1972 | Gunning | 222/402.1 |
| 3,974,252 | 8/1976 | Bischoff, Jr. | 264/299 |
| 4,220,285 | 9/1980 | Gualdi | 239/309 |
| 5,062,549 | 11/1991 | Smith et al. | 222/377 |
| 5,518,151 | 5/1996 | Knickerbocker | 222/382 |

FOREIGN PATENT DOCUMENTS

| 1196323 | 5/1958 | France . | |
|---|---|---|---|
| 529548 | 8/1931 | Germany . | |
| 1107926 | 5/1961 | Germany . | |
| 1189261 | 3/1965 | Germany . | |
| 39 42 308 A1 | 6/1991 | Germany | B29C 69/02 |

*Primary Examiner*—Gregory L. Huson
*Attorney, Agent, or Firm*—Quarles & Brady

[57] ABSTRACT

A fluid media dispenser is disclosed having an uptake tube or wall body configured with differing wall thicknesses so that, due to material shrinkage, a lateral curve is formed in the uptake tube or wall body which facilitates removal of the formed dispenser from a mold. A simplified injection mold/extrusion nozzle method for producing this dispenser is also disclosed.

30 Claims, 1 Drawing Sheet

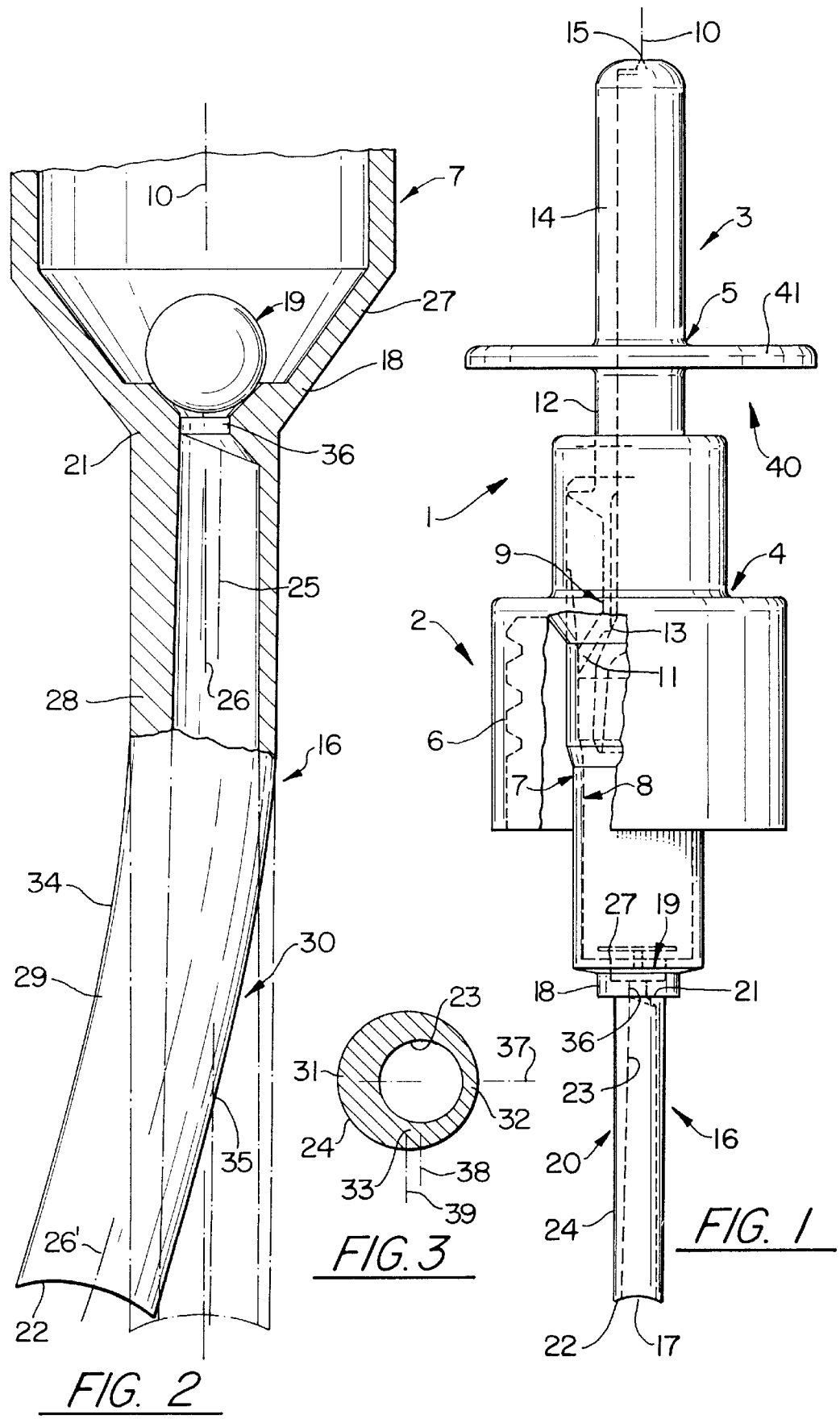

5,862,962

FLUID MEDIA DISPENSER AND METHOD OF MANUFACTURING DISPENSER

TECHNICAL FIELD AND BACKGROUND OF THE INVENTION

The invention relates to a device for discharging compact itemized or flowable media. In the case of pasty media the flowability may materialize only under overpressure, whilst in the case of gaseous, liquid and powdery media it may also materialize solely by gravitation. The invention relates also to a method for producing a discharge device for media.

Such discharge devices comprise a single or several wall bodies, each of which is integral, whereby wall bodies ajoining each other may be configured integral with one another. Such wall bodies may be configured plate or disk shaped, e.g. as a face end wall, and/or sleeve shaped. They may also form part of a housing, such as an outermost main housing, a plunger unit, an outlet port for the medium, an outlet and/or inlet port for the medium or the like. Each wall zone or each wall region of the wall body defines at right angles to the associated outer or surface material thicknesses facing away from each other, whereby the wall may pass through between these surfaces in one piece or with full cross-sections. These cross-sections may be defined in two section planes at right angles to each other, of which one lies e.g. parallel to a longitudinal axis of the wall body and the other transversely thereto.

Substantially all components of such a discharge device and especially of the wall bodies in each case may be produced by approximately the same shaping procedure, e.g. by injection molding or extrusion in a negative mold, from a material which relative to the material volume assumes differing expansions by a few percent under differing temperatures, especially shrinking in the solidified condition as ready for use at room temperature of e.g. 20° C. to an extent as compared to the condition in which it is heated e.g. in fabrication in excess of 100° to 200° C. In this fabrication the material, e.g. a thermoplast solidifies whilst still at the elevated temperature into a production shape and then shrinks e.g. on demolding during cooling by the cited amount until it has attained its useful shape.

Geometrically simple shapes such as planar, linear elongated, axial-symmetrical, circular or similar shapes are easier to produce than non-planar, curved, non-axially symmetrical, non-circular or similar shapes, particularly because the shaping means used in production are easier to fabricate. If for reasons of functioning of the discharge device a less simpler shape of the wall body is needed, there is the requirement to produce it in a shape which is simpler as compared thereto and then directly following and/or in the course of this production to translate the simpler production shape into the less simple useful shape.

OBJECTS OF THE INVENTION

An object of the invention is to provide a dispenser in which drawbacks of known configurations are avoided or advantages of the kind as described are achieved and which in particular comprises wall bodies which are translated from a simpler production shape into a less simple operational shape.

SUMMARY OF THE INVENTION

In accordance with the invention mutual excursion of adjacent wall zones of the wall body in each case in the useful shape as compared to the production shape is achieved in that they are subjected to a thermally promoted reshaping procedure. Although it is feasible to expose the wall body after solidification in the production shape and following demolding to a repeat localized heating to thus reshape it, however, it is expedient for reshaping to make use of the shrinkage behaviour of the material on cooling so that adjacent or juxtaposed wall zones are cooled at differing rates, a temperature gradient then existing between these wall zones, until they have achieved their final, dimensionally stable and rigid useful shape. In the useful shape especially the cross-sections oriented transversely to the longitudinal axis of the wall body are substantially more dimensionally stable or rigid than in the production state when still heated, whilst a pliant excursion or flexibility along the longitudinal axis under the conditions of use may still exist. Thick wall zones shrink more than thin wall zones so that when such wall zones of differing thickness are suitably arranged a significant change in shape results which e.g. as compared to the longitudinal axis does not materialize symmetrically and thus leads to a change in the longitudinal profile and/or the basic shape of the cross-section. For instance, a rod-shaped wall body may be subjected by shrinkage to a rod curvature and/or a cross-section of the rod may be translated into a flatter, for instance, elliptical shape.

The embodiment according to the invention is particularly suitable for sleeve-type or elongated tubular bodies, the inner and/or outer cross-sections of which are produced in an axially symmetrical shape or in a shape having circular cross-sections each oriented in a separate axis. When the longitudinal axes of these cross-sections are located eccentrically and/or in a common axial plane inclined to each other at an angle of few degrees, the sleeve features in this axial plane a minimum wall thickness on one side of the longitudinal axes and on the other side thereof a maximum wall thickness, these wall thicknesses continually or smoothly translating into each other. On removal of the wall body from the casting mold the thicker wall region shrinks quicker than the thinner and the tubular body is thereby translated from the linear elongated production shape into a curved useful shape in which the center lines of its two ends are located interrelated at an obtuse angle of e.g. more than 150°.

As a result of this the tubular body is particularly suitable as an intake, suction or uptake tube, via the free end of which the discharge device draws medium from the bottom region of a container into a pressure or pump chamber from which this drawn-in medium is then discharged through a discharge orifice. The uptake tube may be configured integral with the walls defining the discharge or pressure space, particularly with the shell thereof and adjoin the wall face of this space. As viewed axially the free end of the tube in the relaxed or unloaded condition assumes a precise location with respect to the walls of the space to the extent that it is located in the peripheral direction about the longitudinal axis at a predetermined position.

The corresponding wall zone may have parallel to the longitudinal axis over the full length of the wall body the maximum or minimum material thickness or an approximately constant wall thickness, however, it is also feasible to provide this corresponding thickness along an ascending spiral so that the wall body on shrinkage is curved in two planes at right angles to each other. Advantageously the wall thickness diminishes towards the free end of the wall body by a few angular degrees of e.g. less than 5° to permit simple removal from the casting mold by extracting the wall body in its longitudinal direction, the thicker wall region diminishing to advantage, relative to its wall thickness, less in percentage than the thin wall region.

A method according to the invention for producing a discharge device in which a wall body, such as a shell body, the shaping of which is done in a casting mold and then extracted from the casting mold in the production shape thus attained, as well as translating it into a final or useful shape by cooling and shrinkage is characterized according to the invention in that adjacent wall zones of the wall body following removal from the casting mold experience a mutual excursion by differing temperature exposure and are thus translated into the useful shape. Expediently, after material solidification and prior to removal from the casting mold or then at the latest, the wall zones are set to roughly the same temperature, they then cooling following or respectively at commencement of removal from the casting mold to a common temperature and thereby experience a mutual excursion. For this purpose, on cooling, the wall zones may be thermally exposed to heat reservoirs having differing reservoir capacities which may be formed directly by the wall zones so that an inherent thermal coupling materializes. On cooling the wall zones are exposed to differing degrees of shrinkage per unit of length and thus experience a mutual excursion.

These and further features are evident not only from the claims but also from the description and the drawings, each of the individual features being achieved by themselves or severally in the form of subcombinations in one embodiment of the invention and in other fields and may represent advantageous aspects as well as being patentable in their own right, for which protection is sought in the present.

BRIEF DESCRIPTION OF THE DRAWINGS

An example embodiment of the invention is explained in more detail in the following and illustrated in the drawings in which:

FIG. 1 shows a discharge device according to the invention as viewed transversely FIG. 2 shows a section of the illustration greatly magnified in FIG. 1, and FIG. 3 shows a cross-sections through the wall body according to FIG. 2

DETAILED DESCRIPTION

The discharge device 1 comprises two units 2, 3 which are require manually moving against each other, e.g. linearly shifted against each other for actuation or activation of the media discharge. Each of the units 2, 3 contains a housing 4 and 5 respectively forming its exposed outer side in use which is produced together with all other wall bodies formed integrally therewith by injection molding from plastics material. The main housing 4 of the unit 2 is to be connected fixedly located or integral with a media reservoir, such as the neck of a small bottle, by a fastener 6 which may be formed by a cap-shaped housing section or integrally with the housing 4. With radial spacing and within the fastener 6 the housing 4 forms a pressure housing 7 which surrounds a pressure space 8 at the outer periphery. The pressure space 8 could be formed by a media reservoir to be filled with a propellant, in this case, however, it is a pumping space of variable volume through the restriction of which the medium existing therein is forced out of the discharge device. This pressure space could also form the sole media reservoir of the discharge device.

The unit 3 contains a plunger unit 9 which is shiftable with respect to the base body or housing 4 along the longitudinal or central axis 10 to eject medium from the pressure space 8 and on its return stroke to suck medium back into the pressure space 8. The plunger unit 9 comprises a displacement member or plunger 11 which substantially closes off one face end of the pressure space 8 and is arranged on a piston rod 12 passing through the housing 4 or protruding from the outer end thereof. The plunger unit 9 carries an outlet valve 13 which by abutment at the end of the pump stroke and/or due to fluid pressure in the pressure space 8 opens and on a drop in pressure automatically recloses.

The extension of the piston rod 12 translates at its end facing away from the plunger 11 into an outlet port 14 at the free end of which the outlet orifice 15, e.g. an atomizing nozzle, for discharging the medium to the atmosphere is provided. On opening of the valve 13 the medium flows from the pressure space along the inner periphery of the hollow plunger 11 within the piston rod 12 and the discharge port 14 up to the media outlet 14. The outlet passage may be defined between valve 13 and the outlet orifice 15 by the inner peripheries of the bodies 12, 14 and a rod-shaped inner body inserted in the latter which forms the valve seat of the valve 13 and may serve to support a return spring located in the pressure space 8 for the plunger unit 9. The arrangements 1 to 15 are expediently located on a common central axis 10 or in longitudinal axes offset transversely to each other but in parallel.

For filling the pressure space 8 with medium a wall body 16, namely a tube which is dimensionally rigid under the assembly forces occurring or tubing which is flexible when exposed to such loads, is provided. This wall body 16 is translated from the linear production shape according to the invention as illustrated in FIG. 1 or indicated dot-dashed in FIG. 2 into the curved useful shape illustrated in FIG. 2 in which it has the stated dimensional rigidities. Each of the bodies 2 to 7, 9 and 11 to 14 could form, contain or be formed by such a wall body.

The innermost free end of the uptake tube 16 facing away from the outlet 15 forms an intake opening 17 passing through the end surface for the medium. The other end integrally adjoins the outermost wall face 18 of the housing 7 which may also form the valve seat of an inlet valve 19 for the pressure space 8. This inlet valve 19 may comprise a plate-shaped valve housing as shown in FIG. 1, a ball-shaped valve plate as shown in FIG. 2 or the like which may be opened only by the fluid pressure and, where necessary, may be urged into the closing position by a spring located within the pressure space 8. The housing 7 comprises in the region of the connection to the tube 16 opposite thereto a larger outer width and the outer width of the wall body in each case is expediently less than 50, 20, 10 or 5 mm. The tube 16 has preferably a maximum outer width of less than 4 mm and a maximum inner width of less than 3 mm or a maximum wall thickness of less than 3 or 2 mm. The wall thicknesses of the tube 16 are adapted in effect to their material properties, particularly to their shrinkage properties in producing the shape so that shrinkage means 20 are formed. Due to these the tube 16 shrinks from its straight shape into the excursion or curved shape, and at the end of this shrinkage it achieves the finished shape or final condition durably hardened and inherently stable.

Between its two ends 21, 22 the tube 16 has a length which is greater than four, six or ten times its maximum outer width. Except for a demolding conicity of 6 or 3 angular degrees at the most the outer width or inner width of the tube 16 is substantially constant over this length. Its wall thickness continually diminishes towards the free end roughly corresponding to this conicity and also continuously varies in each longitudinal section around the periphery between a maximum value and a minimum value. The inner periphery 23 like the oc 24 is circular in cross-sections over the full length. The inner periphery 23 is flared towards the free end and the outer periphery 24 is diminished to permit extraction and removal at the end 22 of a molding core for molding the inner periphery 23 and a molding sleeve for molding the outer periphery 24 on demolding. The two peripheries 23, 24 and their center lines 25, 26 respectively are located in both conditions as illustrated in FIGS. 1 and 2 to a degree eccentrically to each other which is substantially smaller than the mean width of the inner periphery 23 or the half thereof. In addition, the center lines 25, 26 are located in both conditions and over the full length of the tube 16 in a common axial plane 37 or in two axial planes 38, 39 offset from each other by this degree of eccentricity and at right angles to the latter axial plane. The axes 25, 26 approach each other at the end 22 at one of the angles cited and intersect at a spacing outside of the end 22 so that their maximum distance lies at the end 21.

The end 21 integrally translates into a housing section 27 forming the wall face 18 which as shown in FIG. 1 may have a constant outer width over its length which is greater than that of the end 21 and smaller than that of the housing 7. This section 27 having a dish-shaped cross-section forms together with the dished bottom the wall face 18. As shown in FIG. 2 the housing section 25 has the shape of a truncated cone. Its tapered end translates into the end 21 having the same outer width. Its flared end translates correspondingly into the sleeve of the housing 7. The end surface 22 comprises expediently sections axially offset with respect to each other, e.g. as viewed from the side at right angles to the plane 37 a concave shape so that the medium is also able to flow radially to the intake opening 17 when the end surface 22 in the region of diametrally opposed points ajoins the inner surface of the media reservoir.

Due to the configuration as described, in the longitudinal direction of the tube 16 adjacent or adjoining wall zones 28, 29 are formed, each of which extends over the full tubular circumference and, on shrinkage, experience a mutual excursion, thereby forming a curvature 30 of the tube 16. As a result of this an excursion of the end 22 occurs with respect to the axis 10 into a precisely defined radial direction sideways into its useful shape in which it may roughly adjoin the envelope surface about the outer side of the housing 7. In the cross-section as shown in FIG. 3 the sleeve of the tube 16 forms on one side of the planes 38, 39 and in region of the plane 37 a wall region 31 of maximum thickness. On the other side of the planes 38, 39 the sleeve forms in the region of the plane 37 a wall portion 32 of minimum thickness. Both wall regions 31, 32 intertranslate via wall regions 33 opposing each other on both sides of the plane 37, each of which is curved approximately by 180° and consistently diminish in thickness from region 31 to region 32. The wall regions 31 to 33 are defined solely by the peripheries 23, 24.

On shrinking and curving the tube 16 or its axis 25, 26 thus remains over its full length in the plane 37 and the excursion occurs exclusively transversely or at right angles to the planes 38, 39. The end surface 22 may be provided with respect to the axis 25 or 26 inclined to such an extent that it lies in the excursion condition roughly at right angles to the axis 10 or parallel to the bottom of the media reservoir so that also the last remainders of the medium can be drawn off therefrom. Due to the integral connection of the tube 16 to the housing 7 the associated longitudinal section of the tube 16 is able to remain free of curvature so that the curvature does not begin until spaced away from the end 21 which corresponds to at least a quarter, a third or the half of the length of the tube 16. In the region of the curvature the cross-sections 23, 24 may distort or shrink in the direction of an elliptical useful shape. The center line 26½ of the end 22 in excursion is located at an acute angle to the axis 10 which is greater than the angle of conicity and amounts to a maximum of 40°, 30° or 20°.

In accordance with the invention an uptake tube 16 of defined precurvature and inherently rigid is formed. The thicknesses of the wall regions 31 to 33 continually diminish towards the end 22 or parallel to the axis 25, 26. The curvature 30 forms in the wall region 31 at the outer periphery 24 a curvature inner surface 34 and in the wall region 32 at the outer periphery 24 a curvature outer surface 35. Correspondingly inverse are the curvature relationships of the inner periphery 23 in the portions 31, 32. The inner periphery 23 adjoins at the end 21 the end of greater or equal width of an eccentric funnel-like tapered passage section, the narrower end of which adjoins a through-passage 36 in the face end wall 18 for the medium. The cylindrical through-passage 36 is substantially narrower than the inner periphery which in the wall region 32 parallel to the axis 25 or 26 and steplessly linearly adjoins the inner periphery 23. As a result of this the funnel section as well as the through-passage 36 may be simply produced by the same molding core as the inner periphery 23. The through-passage 26 directly adjoins the valve seat of the valve 19 on the side facing away from the funnel section.

The discharge device 1 is to be manually driven or actuated by an actuator 40 to force the medium from the orifice 15 in an amount metered by the pressure space 8. For this purpose a handle 41 protruding from the outer peripheries of the bodies 12, 14 is pressed by the fingers of one hand so that the unit 3 is pushed in the direction of the tube 16. One finger, particularly the thumb of the hand may thereby support the bottom of the media reservoir. The end 22 may thereby lie in the corner forced inwardly between the bottom surface and the inner periphery of the media reservoir and supported, urged where necessary, by one or both of these surfaces. On release of the actuator 40 the units 2, 3 automatically return to their starting position, as a result of which medium is drawn through the tube 16 into the increasing pressure space 8 for the next discharge.

The stated properties, dimensions, relative positions and the like may be provided precisely or merely roughly or substantially as explained and, where necessary, may depart greatly therefrom.

We claim:

1. A dispenser for discharging media comprising:
   a wall body defining cross-sections, said cross-sections including first cross-section and second cross-section, said second cross-section oriented transverse to said first cross-section, in said cross-sections said wall body having adjacent wall zones,
   said wall zones defining a wall shape inherently determined by said wall zones,
   said dispenser including means for inherently curving said wall zones into said wall shape, said wall body including injection molded zones contiguous with said wall body.

2. The dispenser according to claim 1, wherein said curving means include shrinking means for reciprocally transversely displacing said wall zones by varying a material content per volume unit, said wall zones including wall regions configured to shrink by different amounts under a given common temperature change displacing said wall zones with respect to each other, said wall body including a demolding conicity for being removed from a molding die in a demolding direction.

3. The dispenser according to claim 2, wherein both said first and second cross-sections of said wall regions define individual maximum cross-sections of varying thickness extensions, said thickness extensions varying parallel to said demolding direction.

4. The dispenser according to claim 3, wherein said wall regions interconnect in one part via steady changes of said thickness extensions.

5. The dispenser according to claim 1, wherein, when providing said wall shape, said wall zones define a curvature including a concave curve inside the wall body and a convex curve outside the wall body along said curve inside the wall body said wall zones being strengthened with respect to said curve outside, said curve inside and said curve outside defining a common median plane, along said median plane said curve inside being varyingly spaced from said curve outside.

6. The dispenser according to claim 5, wherein when seen in said second cross-section, said curve inside and said curve outside the wall body are defined by curve surfaces facing away from each other and when seen in said first cross-section said wall zones including wall regions spacedly opposing each other and defining said curve surfaces, at said curve inside said wall regions being thicker than at said curve outside.

7. The dispenser according to claim 6, wherein said wall regions interconnect as one part, when in said wall shape said wall regions being inherently stiff, when seen transverse to said median plane said surface of said curve inside angularly approaching said surface of said curve outside.

8. The dispenser according to claim 1, wherein said wall body includes an oblong jacket body defining a longitudinal axis, said longitudinal axis being oriented transverse to said first cross-sections, in said first cross-sections said wall body defining subject invention-cross-sections including an internal cross-section and an external cross-section, said external cross-section being located eccentric to said internal cross-section, at least one of said subject invention-cross-sections being conical.

9. The dispenser according to claim 8, wherein at least one of said first cross-sections is substantially symmetrical with respect to at least one axial plane of said longitudinal axis.

10. The dispenser according to claim 8, wherein when seen in at least one of said first cross-sections at least one of said internal and external subject invention-cross-sections is oval.

11. The dispenser according to claim 1, wherein in each of said cross-sections said wall body defines substantially continuously varying thickness extensions to provide a demolding conicity for removing said wall body out of a molding die.

12. The dispenser according to claim 2, wherein at least one of said wall regions defines substantially continuously varying thickness extensions unidirectionally varying substantially entirely over said wall body when seen transverse to said demolding direction.

13. The dispenser according to claim 3, wherein said maximum cross-sections of two of said wall regions are located substantially in a common axial plane of at least one longitudinal axis defined by said wall body and oriented substantially parallel to said demolding direction.

14. The dispenser according to claim 2, wherein a thickness extension of at least one of said wall regions varies over an entire length extension of said wall body, said length extension being oriented substantially parallel to said demolding direction.

15. The dispenser according to claim 2, wherein said wall body defines a center axis oriented transverse to said first cross-sections and substantially parallel to said demolding direction, when seen in said first cross-sections said wall regions including first and second wall regions displaced with respect to each other and defining variations in thickness extension per length unit along said center axis, said variation in thickness extension per length unit of said first wall region departing from said variation in thickness extension of said second wall region.

16. The dispenser according to claim 15, wherein in one of said first cross-sections said first wall region is thicker than said second wall region, said variation in thickness extension per length unit of said first wall region being less than said variation in thickness extension per length unit of said second wall region when said variations are calculated in percents of thickness extensions of said wall regions in one of said first cross-sections.

17. The dispenser according to claim 1, wherein in said first cross-sections said wall body defines outermost peripheral surfaces including an inner surface and an outer surface, at least one of said peripheral surfaces being substantially conical at an acute angle substantially over an entire length extension of at least one of said peripheral surfaces.

18. The dispenser according to claim 1, wherein said wall body defines an outer circumferential face and an inner circumferential face, said outer circumferential face being constricted in a first direction and said inner circumferential face being constricted in a second direction oriented substantially opposite to said first direction, said inner circumferential face defining a demolding conicity for being removed out of a molding die in a demolding direction oriented substantially parallel to said first and second direction.

19. The dispenser according to claim 1, wherein said wall body defines first and second shell faces, said first shell face defining a first center axis and said second shell face defining a second center axis located substantially within said first shell face and converging in at least one of said second cross sections with said first center axis.

20. The dispenser according to claim 1 and including a main housing, in an operational state of said dispenser said wall body freely projecting from said main housing made in one part with said wall body and laterally projecting over said wall body, said main housing being wider than said wall body.

21. The dispenser according to claim 20, wherein said wall body is made in one part with an end wall of said main housing, said wall body including a first end of maximum wall thickness adjoining said end wall of said main housing, a wall thickness of said main housing corresponding substantially to said maximum wall thickness of said wall body.

22. The dispenser according to claim 1 and defining a center dispenser axis, a center body axis of said wall body substantially coaxial connecting to said center dispenser axis, said dispenser including a duct boundary of a flow orifice for operationally passing the media, said flow orifice being coaxial with said center body axis.

23. The dispenser according to claim 1 and further including a valve seat, wherein when in said wall shape said wall body includes a riser tube having first and second tube ends, said valve seat being made in one part with said first and second tube ends.

24. The dispenser according to claim 1, wherein said wall body is substantially made from plastic material.

25. The dispenser according to claim 1, wherein said curving means are provided to inherently curve said wall body transverse to a center axis oriented transverse to said first cross-sections, along said center axis and when seen in said second cross-sections said wall body having wall faces including a first wall face and a second wall face remote from said first wall face, said curving means curving said wall faces, a projection being included and projecting over at least one of said wall faces radially with respect to said center axis, said projection being made in one part with said wall faces.

26. The dispenser according to claim 25, wherein said projection includes a valve seat.

27. The dispenser according to claim 25, wherein said projection includes an and wall.

28. The dispenser according to claim 25, wherein said first wall face bounds a media duct for passing the media, said media duct defining a duct width extension, said projection bounding a media passage for passing the media, said media passage defining a width extension differing from said duct width extension.

29. The dispenser according to claim 25 and further including dispenser members rigidly connecting to said wall body, said dispenser members including a pump housing and a fastener for rigidly connecting said dispenser to a media reservoir, wherein at least one of said dispenser members is made in one part with said wall body.

30. The dispenser according to claim 29, wherein said wall body is a riser tube for transferring the media from the media reservoir to said pump housing, said riser tube being longitudinally arcuated and defining a longitudinal demolding conicity for being longitudinally removed out of a molding die commonly with at least one of said dispenser members, said second cross-sections including a longitudinal axial cross-section through said riser tube, said riser tube defining an inner circumferential face and an outer circumferential face eccentric with respect to said inner circumferential face when seen in said first cross-sections.

* * * * *